No. 846,797. PATENTED MAR. 12, 1907.
F. LAMPLOUGH.
ANTIVIBRATION DEVICE FOR VEHICLES.
APPLICATION FILED SEPT. 7, 1906.
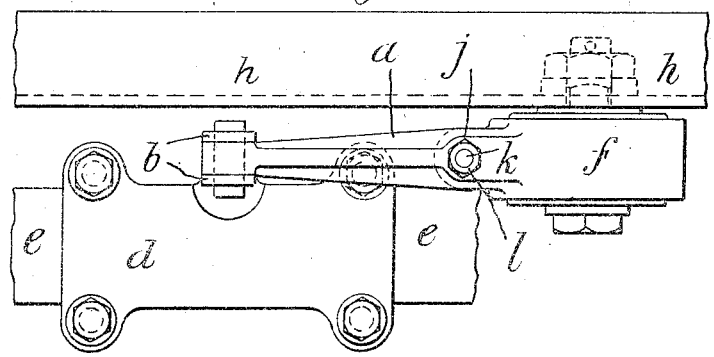
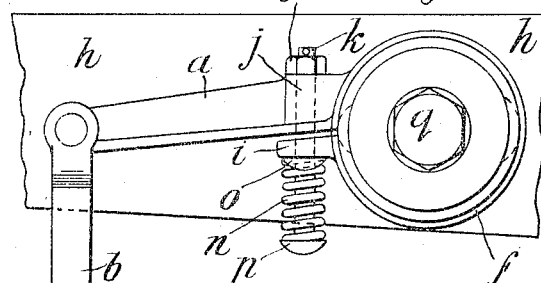
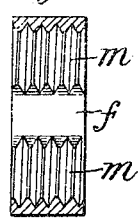
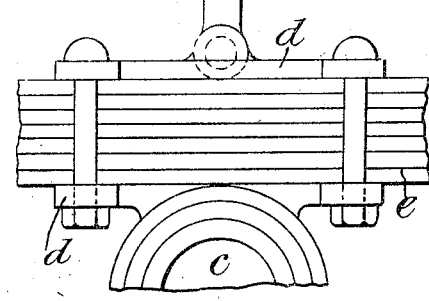

UNITED STATES PATENT OFFICE.

FREDERICK LAMPLOUGH, OF LONDON, ENGLAND.

ANTIVIBRATION DEVICE FOR VEHICLES.

No. 846,797.  Specification of Letters Patent.  Patented March 12, 1907.

Application filed September 7, 1906. Serial No. 333,666.

*To all whom it may concern:*

Be it known that I, FREDERICK LAMPLOUGH, a subject of the King of Great Britain, residing at London, England, have invented new and useful Improvements in and Connected with Antivibration Devices for Vehicles, of which the following is a specification.

The invention relates to that type of antivibration device in which springs of any ordinary construction located between the axle and the body of a vehicle are controlled in their motion by means of arms or levers connected at one end to the body of the vehicle and at the other end to the axle, suitable friction devices being employed to control the action of the springs, and thereby diminish the shocks transmitted from the roadway to the vehicle.

The object of the present invention is to construct a form of such apparatus in which a good grip is obtained between the friction-surfaces and which may be readily adjusted for wear. In the preferred form of carrying the invention into effect the adjustment for wear is effected automatically, and the apparatus only applies friction when the body of the vehicle is moving upward, the body being comparatively free to move downward.

The invention is illustrated in the accompanying drawings, in which—

Figure 1 is an elevation, and Fig. 2 a plan view, and Figs. 3 and 4 sectional details thereof.

In carrying the invention into effect an arm or lever $a$ is pivotally connected at one of its ends, by means of a short link $b$, to the axle $c$ through the parts $d$, fixing the spring $e$ to the axle. The other end of this arm or lever $a$ is connected to a spring-ring $f$, split on one side, provided with means whereby it may be tightened round a large pivot $g$, fixed rigidly to the body or chassis $h$ of the vehicle. The ring $f$ is split at one of its sides, as shown, and carries two perforated lugs $i j$, through which is passed a bolt $k$, by means of which and a nut $l$ the split spring-ring $f$ may be tightened round the pivot. The lever $a$ and lug $j$ are made integral. In order to obtain sufficient friction between the split spring-ring $f$ and pivot $g$, they are formed with interfitting coarse V-shaped threads or rings $m$, as shown at Figs. 3 and 4, or with interfitting coarse V-shaped grooves.

In the above form of the apparatus the head $o$ of the bolt $k$ will bear against the lug $i$, and the requisite friction is obtained by screwing up the nut $l$ on the bolt.

When it is desired for the apparatus to be self-adjusting for wear and to act only in one direction, as previously described, a longer bolt $k$, as shown, is employed and a spring $n$ is placed between the head $p$ of the bolt and its adjacent lug $i$. By such means when the arm or lever $a$ is moved in one direction it will tighten up the split spring-ring $f$ around its pivot $g$ like a brake-strap; but when moved in the other direction it will tend to open the ring $f$, and consequently there will be little or no friction between the parts.

It is preferred to make the pivot $g$ hollow, with an opening on its outer side closed by a screw-cap $q$, and to form holes $r$ from the interior communicating with the threads or grooves, so that lubricant contained in the hollow pivot $g$ may work its way out between the friction-surfaces of the pivot and the split spring-ring $f$.

What I claim is—

1. In antivibration devices for vehicles in which springs located between the axle and the body of the vehicle are controlled by rings fitting frictionally around pivots fixed to the body or chassis of the vehicle and connections from said rings to the axle, the combination of a large pivot, a ring split at one side fitting frictionally around said pivot, large interfitting V-shaped threads around the exterior of the pivot and around the interior of the split ring, lugs on said ring, a bolt passed through said lugs to apply and regulate the friction, an arm integral with one of said lugs, and means pivotally connecting said arm with the axle.

2. In antivibration devices for vehicles in which springs located between the axle and the body of the vehicle are controlled by rings fitting frictionally around pivots fixed to the body or chassis of the vehicle and connections from said rings to the axle, the combination of a large pivot, a ring split at one side fitting frictionally around said pivot, large interfitting V-shaped threads around the exterior of the pivot and around the interior of the split ring, lugs on said ring, a bolt passed through said lugs to apply and regulate the friction, a spring interposed between the bolt-head and the adjacent lug of the split ring, an arm integral with one of said lugs, and means pivotally connecting said arm with the axle.

3. In antivibration devices for vehicles in which springs located between the axle and the body of the vehicle are controlled by rings fitting frictionally around a pivot and having connections to the axle of the vehicle, the combination of a large hollow pivot, a ring split on one side fitting around said pivot, large interfitting V-shaped threads around the exterior of the pivot and around the interior of the split ring, perforations passing from the interior of the pivot to the exterior, lubricant in said hollow pivot, a hole in said pivot for the insertion of the lubricant, and a screw-cap to close said hole.

In witness whereof I have hereunto set my hand in presence of two witnesses.

FREDERICK LAMPLOUGH.

Witnesses:
 WM. GIRLING,
 A. NUTTING.